United States Patent
Li

(10) Patent No.: US 10,938,806 B2
(45) Date of Patent: Mar. 2, 2021

(54) COMMUNICATION METHOD AND DEVICE

(71) Applicant: GUANGDONG OPPO MOBILE TELECOMMUNICATIONS CORP., LTD., Guangdong (CN)

(72) Inventor: Haiquan Li, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 565 days.

(21) Appl. No.: 15/810,847

(22) Filed: Nov. 13, 2017

(65) Prior Publication Data
US 2019/0007831 A1   Jan. 3, 2019

(30) Foreign Application Priority Data

Jun. 28, 2017 (CN) .................. 201710508966.X

(51) Int. Cl.
*H04L 29/06* (2006.01)
*H04W 76/14* (2018.01)
(Continued)

(52) U.S. Cl.
CPC ........ *H04L 63/0861* (2013.01); *H04L 63/083* (2013.01); *H04W 8/183* (2013.01);
(Continued)

(58) Field of Classification Search
CPC ... H04L 63/08; H04L 63/083; H04L 63/0861; H04L 63/0876; H04L 63/18;
(Continued)

(56) References Cited

U.S. PATENT DOCUMENTS 9,398,007 B1* 7/2016 Wegener ............. H04L 63/0861
9,699,817 B2* 7/2017 Ginnela ................. H04W 76/14
(Continued)

FOREIGN PATENT DOCUMENTS

CN   102547685 A   7/2012
CN   104363666 A   2/2015
(Continued)

OTHER PUBLICATIONS

Second Office Action of the Chinese application No. 201710508966.X, dated Sep. 17, 2019.
(Continued)

*Primary Examiner* — Eric W Shepperd
(74) *Attorney, Agent, or Firm* — Ladas & Parry LLP

(57) ABSTRACT

The present disclosure provides a communication method and device. The method includes that: when an instruction for instructing transmitting user data via a direct communication connection is received, user verification information is acquired, the user verification information including verification data input through a first terminal; the user verification information is sent to a second terminal; when verification success information is received from the second terminal, a first direct communication connection is established with the second terminal; and the user data is sent to the second terminal via the first direct communication connection.

15 Claims, 10 Drawing Sheets

(51) Int. Cl.
*H04W 12/06* (2021.01)
*H04W 12/08* (2021.01)
*H04W 8/18* (2009.01)
*H04W 4/80* (2018.01)

(52) U.S. Cl.
CPC ... *H04W 12/0608* (2019.01); *H04W 12/0804* (2019.01); *H04W 76/14* (2018.02); *H04W 4/80* (2018.02)

(58) Field of Classification Search
CPC . H04W 12/00; H04W 12/003; H04W 12/004; H04W 12/00407; H04W 12/0051; H04W 12/00512; H04W 12/009; H04W 12/06; H04W 12/0608; H04W 12/08; H04W 12/0804; H04W 8/18; H04W 8/183; H04W 76/14
See application file for complete search history.

(56) References Cited

U.S. PATENT DOCUMENTS

| | | | |
|---|---|---|---|
| 9,893,894 B2 | 2/2018 | Stojanovski et al. | |
| 2011/0313922 A1* | 12/2011 | Ben Ayed | G06Q 30/06 705/42 |
| 2013/0217359 A1* | 8/2013 | Cherian | G06F 15/177 455/411 |
| 2014/0004793 A1* | 1/2014 | Bandyopadhyay | H04W 12/003 455/41.1 |
| 2014/0079045 A1 | 3/2014 | Kim et al. | |
| 2014/0170974 A1* | 6/2014 | Lin | H04W 12/06 455/41.1 |
| 2015/0016305 A1* | 1/2015 | Douer | H04L 67/04 370/254 |
| 2016/0027009 A1* | 1/2016 | Sivashanmugam | H04L 63/083 705/21 |
| 2016/0241403 A1 | 8/2016 | Lindemann | |
| 2016/0269185 A1 | 9/2016 | Stojanovski et al. | |
| 2017/0134946 A1 | 5/2017 | Kang et al. | |
| 2017/0244703 A1* | 8/2017 | Lee | H04W 12/0605 |
| 2018/0220482 A1* | 8/2018 | Kuang | H04W 76/15 |
| 2019/0159271 A1* | 5/2019 | Wang | H04W 76/14 |
| 2019/0230507 A1* | 7/2019 | Li | H04W 12/06 |

FOREIGN PATENT DOCUMENTS

| | | |
|---|---|---|
| CN | 104394600 A | 3/2015 |
| CN | 104580401 A | 4/2015 |
| CN | 104902579 A | 9/2015 |
| CN | 105208180 A | 12/2015 |
| CN | 105553928 A | 5/2016 |
| CN | 105721468 A | 6/2016 |
| CN | 106355717 A | 1/2017 |
| CN | 107318174 A | 11/2017 |
| WO | 2016019086 A1 | 2/2016 |
| WO | 2017082527 A1 | 5/2017 |

OTHER PUBLICATIONS

First Chinese Office Action with an English translation dated Apr. 29, 2019 for Application No. CN 201710508966.X.
Supplementary European Search Report in European application No. 17203485.2, dated Jun. 20, 2018.
Driscoll E C et al: "A Comparison of Centralized Versus Distributed Architectures in Biometric Access Control Systems", dated Jan. 1, 1989 (Jan. 1, 1989).
English Translation of the International Search Report in international application No. PCT/CN2017/112206, dated Mar. 21, 2018.
English Translation of the Written Opinion of the International Search Authority in international application No. PCT/CN2017/112206, dated Mar. 21, 2018.
Third Office Action of the Chinese application No. 201710508966. X. dated Apr. 3, 2020.
Notice of Rejection of the Chinese application No. 201710508966. X, dated Oct. 12, 2020.

* cited by examiner

US 10,938,806 B2

COMMUNICATION METHOD AND DEVICE

CROSS-REFERENCE TO RELATED APPLICATIONS

This application is filed based upon and claims priority to Chinese Patent Application No. 201710508966.X, entitled "Communication Method, Device and Terminal", filed on Jun. 28, 2017. The entire contents of the application are incorporated herein by reference.

TECHNICAL FIELD

The disclosure relates to the technical field of communications, and particularly, to a communication method and device.

BACKGROUND

With rapid development of an Internet technology, more and more users have the requirement of transmitting user data of local terminals to a server or transmitting the user data to other user terminals through a network. When a user needs to transmit user data of a local terminal to another user terminal in an environment without a network, a direct communication between the terminals may be established for data transmission. Such a direct communication refers to a direct communication between the terminals, and does not involve a third-party device.

SUMMARY

Embodiments of the disclosure provide a communication method and device.

In a first aspect, the embodiments of the disclosure provide a communication method, which may be applied to a first terminal, the method including that: when an instruction for instructing transmitting user data via a direct communication connection is received, user verification information is acquired, the user verification information including verification data input through the first terminal; the user verification information is sent to a second terminal; when verification success information is received from the second terminal, a first direct communication connection is established with the second terminal; and the user data is sent to the second terminal via the first direct communication connection.

In a second aspect, the embodiments of the disclosure provide another communication method, which may be applied to a second terminal, the method including that: a second direct communication connection with a first terminal is established; user verification information is received from the first terminal via the second direct communication connection, and the user verification information is verified; when verification succeeds, verification success information is sent as a response to the first terminal via the second direct communication connection, and a first direct communication connection is established with the first terminal; and user data sent by the first terminal via the first direct communication connection is received.

In a third aspect, the embodiments of the disclosure provide a communication device, which may include: a processor; and a memory configured to store instructions executable for the processor; wherein the processor is configured to perform operations of: when an instruction for instructing transmitting user data via a direct communication connection is received, acquiring user verification information, the user verification information comprising verification data input through the first terminal; sending the user verification information to a second terminal; when verification success information is received from the second terminal, establishing a first direct communication connection with the second terminal; and sending the user data to the second terminal via the first direct communication connection.

In a fourth aspect, the embodiments of the disclosure provide another communication device, which may include: a processor; and a memory configured to store instructions executable for the processor; wherein the processor is configured to perform operations of: establishing a second direct communication connection with a first terminal; receiving user verification information from the first terminal via the second direct communication connection, and verifying the user verification information; when verification succeeds, responding to the first terminal with verification success information via the second direct communication connection, and establishing a first direct communication connection with the first terminal; and receiving user data from the first terminal via the first direct communication connection.

BRIEF DESCRIPTION OF DRAWINGS

In order to describe the technical solutions of the embodiments of the disclosure or related art more clearly, the drawings required to be used for descriptions on the embodiments or the embodiments or the related art will be described briefly below. It is apparent that the drawings described below are only some embodiments of the disclosure. For those skilled in the art, other drawings may further be conceived according to these drawings without creative work.

DETAILED DESCRIPTION

Figure 1:
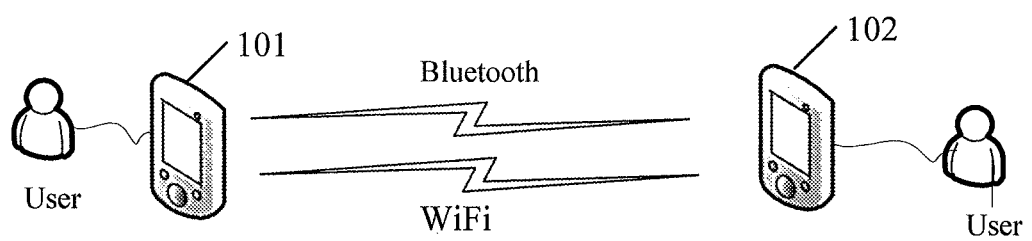
FIG. 1 is a structure diagram of a system for direct communication between terminals according to an embodiment of the disclosure.

In order to make the solutions of the disclosure better understood by those skilled in the art, the technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those skilled in the art on the basis of the embodiments in the disclosure without creative work will fall within the scope of protection of the disclosure.

Terms "first", "second" and the like in the specification, claims and drawings of the disclosure are intended to describe a specific sequence but to distinguish similar objects. In addition, terms "include" and "have" and any transformation thereof are intended to cover nonexclusive inclusions. For example, a process, method, system, product or equipment including a series of operations is not limited to the operations which are listed, but optionally further includes other operations which have not been listed, or optionally further includes other operations which are intrinsic to the process, the method, the product or the equipment.

"Embodiment" mentioned in the disclosure means that specific characteristics, structures or properties described in conjunction with the embodiments may be included in at least one embodiment of the disclosure. "Embodiment" appearing at various positions in the specification does not always refer to the same embodiment or an independent or alternative embodiment exclusive to the other embodiments. Those skilled in the art explicitly and implicitly understand that the embodiments described in the disclosure may be combined with the other embodiments.

A terminal involved in the embodiments of the disclosure may include various handheld equipment, vehicle-mounted equipment, wearable equipment, computing equipment or other processing equipment connected to a wireless modem, which has a wireless communication function, and User Equipment (UE), Mobile Station (MS), terminal device and the like in various forms. For convenient description, the equipment mentioned above is collectively referred to as terminal. The embodiments of the disclosure will be introduced below in detail.

According to some embodiments, there is provided a communication method, applied to a first terminal, the method comprising: when an instruction for instructing transmitting user data via a direct communication connection is received, acquiring user verification information, the user verification information comprising verification data input through the first terminal; sending the user verification information to a second terminal; when verification success information is received from the second terminal, establishing a first direct communication connection with the second terminal; and sending the user data to the second terminal via the first direct communication connection.

In some embodiments, the method further comprises: establishing a second direct communication connection with the second terminal, wherein the first terminal transmits the user verification information to the second terminal via the second direct communication connection, receives the verification success information from the second terminal via the second direct communication connection, and transmits, via the second direct communication connection, at least one connection parameter for establishing the first direct communication connection between the first terminal and the second terminal.

In some embodiments, acquiring the user verification information when the instruction for instructing transmitting the user data via the direct communication connection is received comprises: when the instruction for instructing transmitting the user data via the direct communication connection is received, determining a security transmission rule, the security transmission rule being preset for the second terminal; and when the security transmission rule indicates that an identity of a user of the first terminal is required to be verified, acquiring the verification data.

In some embodiments, the user verification information further comprises an identifier of the first terminal.

In some embodiments, acquiring the verification data comprises: invoking a fingerprint acquisition interface of the first terminal to acquire a fingerprint as the verification data.

In some embodiments, the first direct communication connection is a Wi-Fi hotspot communication connection established between the first terminal and the second terminal, and the second direct communication connection is a Blue-tooth communication connection or Near Field Communication (NFC) connection established between the first terminal and the second terminal.

In some embodiments, the method further comprises: determining, by the first terminal, whether its own power is less than a preset threshold; and when the power of the first terminal is less than the preset threshold, establishing the second direct communication connection with the second terminal.

In some embodiments, the method further comprises: when the power of the first terminal is greater than or equal to the present threshold, establishing directly the first direct communication connection with the second terminal without establishing the second direct communication connection.

According to some embodiments, there is provided communication method, applied to a second terminal, the method comprising: establishing a second direct communication connection with a first terminal; receiving user verification information from the first terminal via the second direct communication connection, and verifying the user verification information; when verification succeeds, responding to the first terminal with verification success information via the second direct communication connection, and establishing a first direct communication connection with the first terminal; and receiving user data sent by the first terminal via the first direct communication connection.

In some embodiments, the method further comprises: before receiving the user verification information from the first terminal via the second direct communication connection, acquiring and storing authentication information of a user of the first terminal, and wherein the verifying the user verification information comprises: matching the authentication information with the verification data contained in the user verification information received from the first terminal, and determining whether the verification successes according to a result of the matching.

In some embodiments, establishing the first direct communication connection with the first terminal comprises: transmitting, via the second direct communication connection, at least one connection parameter for establishing the first direct communication connection between the first terminal and the second terminal; and establishing the first direct communication connection with the first terminal according to the at least one connection parameter.

In some embodiments, the authentication information is a fingerprint of a user of the first terminal, and the verification data is fingerprint data.

In some embodiments, the user verification information further comprises an identifier of the first terminal, the matching the authentication information with the verification data contained in the user verification information received from the first terminal comprises: comparing a correspondence between the identifier of the first terminal and the verification data, which are received from the first terminal, with a correspondence between the identifier of the first terminal and the authentication information, which are pre-stored in the second terminal.

In some embodiments, the first direct communication connection is a Wi-Fi hotspot communication connection established between the first terminal and the second terminal, and the second direct communication connection is a Blue-tooth communication connection or NFC connection established between the first terminal and the second terminal.

According to some embodiments, there is provided a communication device, applied to a first terminal, the device comprising: a processor; and a memory configured to store instructions executable for the processor; wherein the processor is configured to perform operations of: when an instruction for instructing transmitting user data via a direct communication connection is received, acquiring user verification information, the user verification information comprising verification data input through the first terminal; sending the user verification information to a second terminal; when verification success information is received from the second terminal, establishing a first direct communication connection with the second terminal; and sending the user data to the second terminal via the first direct communication connection.

In some embodiments, the processor is further configured to perform operations of: establishing a second direct communication connection with the second terminal, wherein the first terminal transmits the user verification information to the second terminal via the second direct communication connection, receives the verification success information from the second terminal via the second direct communication connection, and transmits, via the second direct communication connection, at least one connection parameter for establishing the first direct communication connection between the first terminal and the second terminal.

In some embodiments, acquiring the user verification information when the instruction for instructing transmitting the user data via the direct communication connection is received comprises: when the instruction for instructing transmitting the user data via the direct communication connection is received, determining a security transmission rule, the security transmission rule being preset for the second terminal; and when the security transmission rule indicates that an identity of a user of the first terminal is required to be verified, acquiring the verification data.

In some embodiments, the user verification information further comprises an identifier of the first terminal.

In some embodiments, acquiring the verification data comprises: invoking a fingerprint acquisition interface of the first terminal to acquire a fingerprint as the verification data.

In some embodiments, the first direct communication connection is a Wi-Fi hotspot communication connection established between the first terminal and the second terminal, and the second direct communication connection is a Blue-tooth communication connection or NFC connection established between the first terminal and the second terminal.

In some embodiments, the processor is further configured to: determine whether its own power is less than a preset threshold; and when the power of the first terminal is less than the preset threshold, establish the second direct communication connection with the second terminal.

In some embodiments, the processor is configured to when the power of the first terminal is greater than or equal to the present threshold, establish directly the first direct communication connection with the second terminal without establishing the second direct communication connection According to some embodiments, there is provided a communication device, applied to a second terminal, the device comprising: a processor; and a memory configured to store instructions executable for the processor; wherein the processor is configured to perform operations of: establishing a second direct communication connection with a first terminal; receiving user verification information from the first terminal via the second direct communication connection, and verifying the user verification information; when verification succeeds, responding to the first terminal with verification success information via the second direct communication connection, and establishing a first direct communication connection with the first terminal; and receiving user data from the first terminal via the first direct communication connection.

In some embodiments, the processor is further configured to acquire and store, before receiving the user verification information from the first terminal via the second direct communication connection, authentication information of a user of the first terminal, and wherein the verifying the user verification information comprises: matching the authentication information with the verification data contained in the user verification information received from the first terminal, and determining whether the verification successes according to a result of the matching.

In some embodiments, establishing the first direct communication connection with the first terminal comprises: transmitting, via the second direct communication connection, at least one connection parameter for establishing the first direct communication connection between the first terminal and the second terminal; and establishing the first direct communication connection with the first terminal according to the at least one connection parameter.

In some embodiments, the authentication information is a fingerprint of a user of the first terminal, and the verification data is fingerprint data.

In some embodiments, the user verification information further comprises an identifier of the first terminal, the matching the authentication information with the verification data contained in the user verification information received from the first terminal comprises: comparing a correspondence between the identifier of the first terminal and the verification data, which are received from the first terminal, with a correspondence between the identifier of the first terminal and the authentication information, which are pre-stored in the second terminal.

In some embodiments, the first direct communication connection is a Wi-Fi hotspot communication connection established between the first terminal and the second terminal, and the second direct communication connection is a Blue-tooth communication connection or NFC connection established between the first terminal and the second terminal.

According to some embodiments, there is provided a terminal, comprising: a memory, a processor, and a computer program stored in the memory and executable for the processor, the processor performing the computer program for executing any of the methods as recited above.

According to some embodiments, there is provided a non-transitory computer-readable storage medium having stored therein computer instructions that, when executed by a processor, cause the processor to perform any of the methods as recited above.

FIG. 1 is a structure diagram of a system for direct communication between terminals according to an embodiment of the disclosure. The embodiment of the disclosure may be, for example, applied to a terminal. The system 100 includes a first terminal 101 and second terminal 102 illustrated in FIG. 1. The first terminal 101 and the second terminal 102 may communicate with each other by establishing a direct communication connection. Here, the direct communication connection may refer to a direct communication between the first terminal 101 and the second terminal 102 without using third-party equipment. The direct communication connection may include a first direct communication connection and second direct communication connection based on different transmission modes.

According to the system provided by the embodiment of the disclosure, the first terminal acquires user fingerprint information (user verification information), and sends an acquired user fingerprint to the second terminal for verification, thereby implementing security verification for data transmission between the first terminal and the second terminal. The direct communication connection is then established between the first terminal and the second terminal, and data transmission is performed through the direct communication connection.

Figure 10:
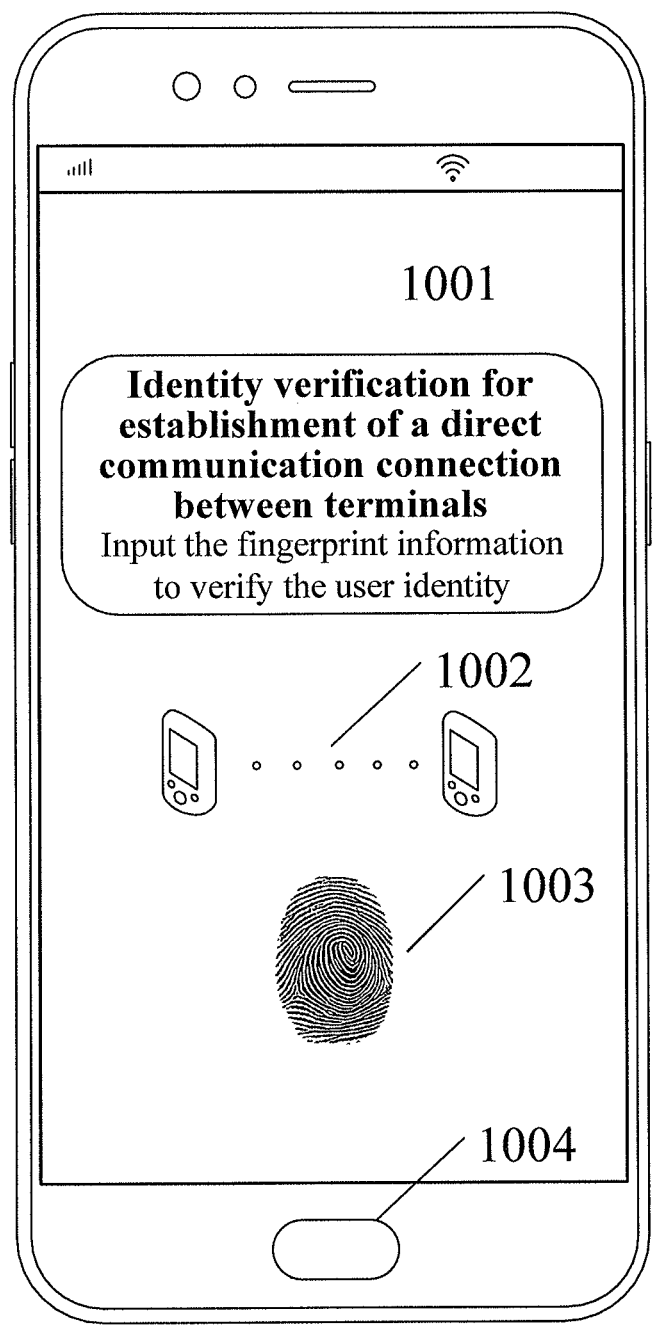
FIG. 10 is a schematic diagram of an interface for fingerprint-based direct communication of terminals according to an embodiment of the disclosure.

In an embodiment, the first terminal may output a prompting interface, as illustrated in FIG. 10, when an instruction for instructing transmitting user data via a direct communication connection is received. FIG. 10 is a schematic diagram of an interface for fingerprint-based direct communication of terminals according to an embodiment of the disclosure. When the instruction for instructing transmitting user data via the direct communication connection, the first terminal outputs prompting information 1001, a prompting icon 1002, and fingerprint prompting icon 1003. The prompting icon 1002 is used to indicate waiting for direct communication establishment between the terminals. The fingerprint prompting icon 1003 is used for prompting a user to input the user fingerprint. Here, the prompting information 1001 is configured to prompt the user that identity verification is required for establishing of the direct communication connection between the terminals, and to prompt the user to input fingerprint information to verify an identity of the user. The prompting icon 1002 represents that the terminals are waiting for direct communication establishment. The fingerprint prompting icon 1003 is an icon configured to prompt the user to input the fingerprint information, thereby verifying the identity of the user. After the first terminal outputs the prompting information 1001, the user inputs the user fingerprint at a button 1004 in FIG. 10 according to the prompting information 1001 and the prompting icons 1002 and 1003. The first terminal may send the acquired user fingerprint to the second terminal for verification, so that security verification for data transmission between the first terminal and the second terminal may be implemented. When the second terminal determines that verification succeeds, the prompting interface as illustrated in FIG. 10 disappear, and the direct communication connection between the first terminal and the second terminal is established, and then data transmission is performed through the direct communication connection.

In an embodiment, a manner for establishing the direct communication connection between the first terminal 101 and the second terminal 102 may be as follows: the first terminal 101 and the second terminal 102 establish the first direct communication connection on the basis of a first transmission mode (for example, on the basis of a transmission mode of a Wireless Fidelity (Wi-Fi) hotspot created by the terminal); and the first terminal 101 and the second terminal 102 establishes the second direct communication connection on the basis of a second transmission mode (for example, a transmission mode of Bluetooth and NFC).

In an embodiment, when the first direct communication connection is established, the second direct communication connection may be established at first, and then the connection data for the first transmission mode is communicated via the second direct communication connection. The connection data may include, for example, data of a username, access password and the like of the Wi-Fi hotspot. Here, an energy consumption value of the second direct communication connection consumed during data interaction is smaller than energy consumption of the first direct communication connection consumed during data interaction.

After establishing the second direct communication connection, the first terminal 101 may actively enable a Wi-Fi hotspot function of the first terminal 101 to facilitate establishment of the first communication connection with the second terminal 102. Alternatively, after establishing the second direct communication connection, the first terminal 101 may trigger the second terminal 102 to enable the Wi-Fi hotspot function through the second communication connection, such that the first terminal 101 can access the second terminal 102 to establish the first direct communication connection.

In an embodiment, the first terminal 101 may judge whether the first terminal 101 has enabled a function of establishing the second direct communication connection, for example, whether the first terminal 101 has enabled a Bluetooth function, at first. When a judgment result indicates that the first terminal 101 has enabled the function of establishing the second direct communication, the first terminal 101 establishes the second direct communication connection with the second terminal 102. The first terminal 101 then transmits the data of the username, access password and the like to the second terminal 102 through Bluetooth for creating the Wi-Fi hotspot. The first terminal 101 may trigger the second terminal 102 to enable the Wi-Fi hotspot function on the basis of a Bluetooth connection, such that the first terminal 101 can access the second terminal 102 to establish the Wi-Fi hotspot.

In an embodiment, the first terminal 101 may have a direct communication button. When the direct communication button is in an on state, the first terminal 101 is triggered to automatically enable a function for establishing the first communication connection and function for establishing the second direct communication connection in the first terminal. For example, a Bluetooth function and the Wi-Fi hotspot function of the first terminal are enabled to create the Wi-Fi hotspot.

In an embodiment, when the first terminal 101 needs to establish a Wi-Fi hotspot-based connection (i.e., the first direct communication connection) with the second terminal 102, the first terminal 101 may judge whether power of the first terminal 101 is lower than a preset threshold value at first. When the power of the first terminal 101 is lower than a preset threshold value, the first terminal 101 is triggered to establish the Bluetooth connection (i.e., the second direct communication connection) with the second terminal 102. The first terminal 101 transmits the data of the username, access password and the like configured for the Wi-Fi hotspot through the Bluetooth connection to establish the Wi-Fi hotspot connection between the first terminal 101 and the second terminal 102. Here, the first terminal 101 may trigger the second terminal 102 to enable the Wi-Fi hotspot function on the basis of the Bluetooth connection, such that the first terminal 101 can access the second terminal 102 to establish the Wi-Fi hotspot. When the power of the first terminal is higher than the preset threshold value, the first terminal 101 is triggered to directly establish the Wi-Fi hotspot-based connection with the second terminal 102. The first terminal 101 may create the Wi-Fi hotspot, such that the second terminal 102 can access the Wi-Fi hotspot. Alternatively, the second terminal 102 creates the Wi-Fi hotspot, such that the first terminal 101 can access the Wi-Fi hotspot.

In an embodiment, the first terminal 101 and the second terminal 102 may transmit the data of the username, access password and the like for creating the Wi-Fi hotspot to the second terminal 102 by scanning a two-dimensional code, so that the first terminal 101 can establish the Wi-Fi hotspot connection with the second terminal 102. When the first terminal 101 creates the Wi-Fi hotspot, the first terminal 101 generates a two-dimensional code including the data of the username, password and the like of the Wi-Fi hotspot. The first terminal 101 then displays the two-dimensional code in a preset user interface for the second terminal 102 to scan. When the second terminal 102 creates the Wi-Fi hotspot, the second terminal 102 generates the two-dimensional code including the data of the username, password and the like of the Wi-Fi hotspot. The second terminal 102 then displays the two-dimensional code in a preset user interface for the first terminal 101 to scan.

For convenient description, descriptions about the technical solutions of the embodiments of the disclosure may be made below with the system illustrated in FIG. 1 as an example.

According to the system illustrated in FIG. 1, in an embodiment, the first terminal 101 may acquire user verification information when an instruction for instructing transmitting user data via a direct communication connection is received in a direct communication mode. The user verification information may include verification data input through the first terminal and an equipment identifier of the first terminal. The verification data may be, for example, data for identifying the user of the first terminal. For example, the verification data may be one of fingerprint identification information, iris recognition information, facial recognition information, retina recognition information, pulse information, signature, and voice, or any combination thereof. For example, the verification data may be a combination of two or three, or even more of fingerprint identification information, iris recognition information, facial recognition information, retina recognition information, pulse information, signature, and voice. It will be understood, however, that fingerprint identification information, iris recognition information, facial recognition information, retina recognition information, pulse information, signature and voice are just examples and that verification data may include any other data that identifies the user of the first terminal. Here, the direct communication mode may include a first direct communication mode or a second direct communication mode. Here, the first direct communication mode may be used to transmit the user data between the first terminal and the second terminal, and may be a direct communication mode with higher security. The second direct communication mode may be used to transmit the user verification information and verification success information between the first terminal and the second terminal and may transmit a connection parameter for establishing a first direct communication connection between the first terminal and the second terminal.

In an embodiment, after acquiring the user verification information in the second direct communication mode, the first terminal 101 sends the user verification information to the second terminal 102 to enable the second terminal 102 to verify the received user verification information. The second terminal 102 may respond to the first terminal 101 with the verification success information when the second terminal 102 succeeds to verify the user verification information. The second terminal 102 may respond to the first terminal 101 with verification failure information when the second terminal 102 fails to verify the user verification information.

In an embodiment, when the first terminal 101 receives the verification success information from the second terminal 102 in the second direct communication mode, the first terminal 101 establishes the first direct communication connection with the second terminal 102. After the first terminal 101 establishes the first direct communication connection with the second terminal 102, the first terminal 101 may send the user data to the second terminal 102 in the first direct communication connection mode. When the first terminal 101 receives the verification failure information from the second terminal 102 in the second direct communication mode, the first terminal 101 may send prompting information to the second terminal 102. The prompting information is used for prompting the second terminal 102 to perform a second verification. The second terminal 102 performs a second verification on the first terminal 102 in response to the prompting information. The second terminal 102 responds to the first terminal 101 with the verification success information when the second terminal 102 has succeeded to verify an identity of the first terminal 101. The first terminal 101 receives the verification success information, which is responded by the second terminal 102 in response to the prompting information. The first terminal 101 then establishes the first direct communication connection with the second terminal 102 according to the verification success information responded by the second terminal 102.

It is to be noted that, in an embodiment of the disclosure, the first terminal 101 may establish a second direct communication connection with the second terminal 102. The second direct communication connection is used for transmitting the user verification information and the verification success information between the first terminal 101 and the second terminal 102 and for transmitting the connection parameter for establishing the first direct communication connection between the first terminal 101 and the second terminal 102 via the second direct communication connection. Here, the first direct communication connection is used for transmitting the user data between the first terminal 101 and the second terminal 102.

It is to be noted that, in an embodiment of the disclosure, when the first terminal 101 needs to send the user data to the second terminal 102 in the direct communication mode, the first terminal 101 may determine a security transmission rule which is preset for the second terminal 102. When the security transmission rule indicates that the user identity of the first terminal 101 is required to be verified, a fingerprint acquisition interface is invoked to acquire fingerprint information, and the acquired fingerprint information is determined as the verification data contained in the user verification information.

It is to be noted that, in an embodiment of the disclosure, the first terminal 101 may serve as a receiver, and verifies user verification information when receiving the user verification information sent by the second terminal 102 via the second direct communication connection established with the second terminal 102. When the first terminal 101 succeeds to verify the user verification information, the first terminal 101 responds to the second terminal 102 with verification success information via the second direct communication connection. When the first terminal 101 fails to verify the user verification information, the first terminal 101 responds to the second terminal 102 with verification failure information via the second direct communication connection. It is to be noted that, after the first terminal 101 fails to verify the user verification information sent by the second terminal 102 and responds to the second terminal 102 with the verification failure information, when the first terminal 101 receives prompting information returned by the second terminal 102 to request to perform a second verification on the user identity of the first terminal, the first terminal 101 performs a second verification on the user identity of the second terminal 102 in response to the prompting information sent by the second terminal 102. When verification succeeds, the first terminal 101 sends the verification success information to the second terminal 102 in the second direct communication mode.

Figure 2:
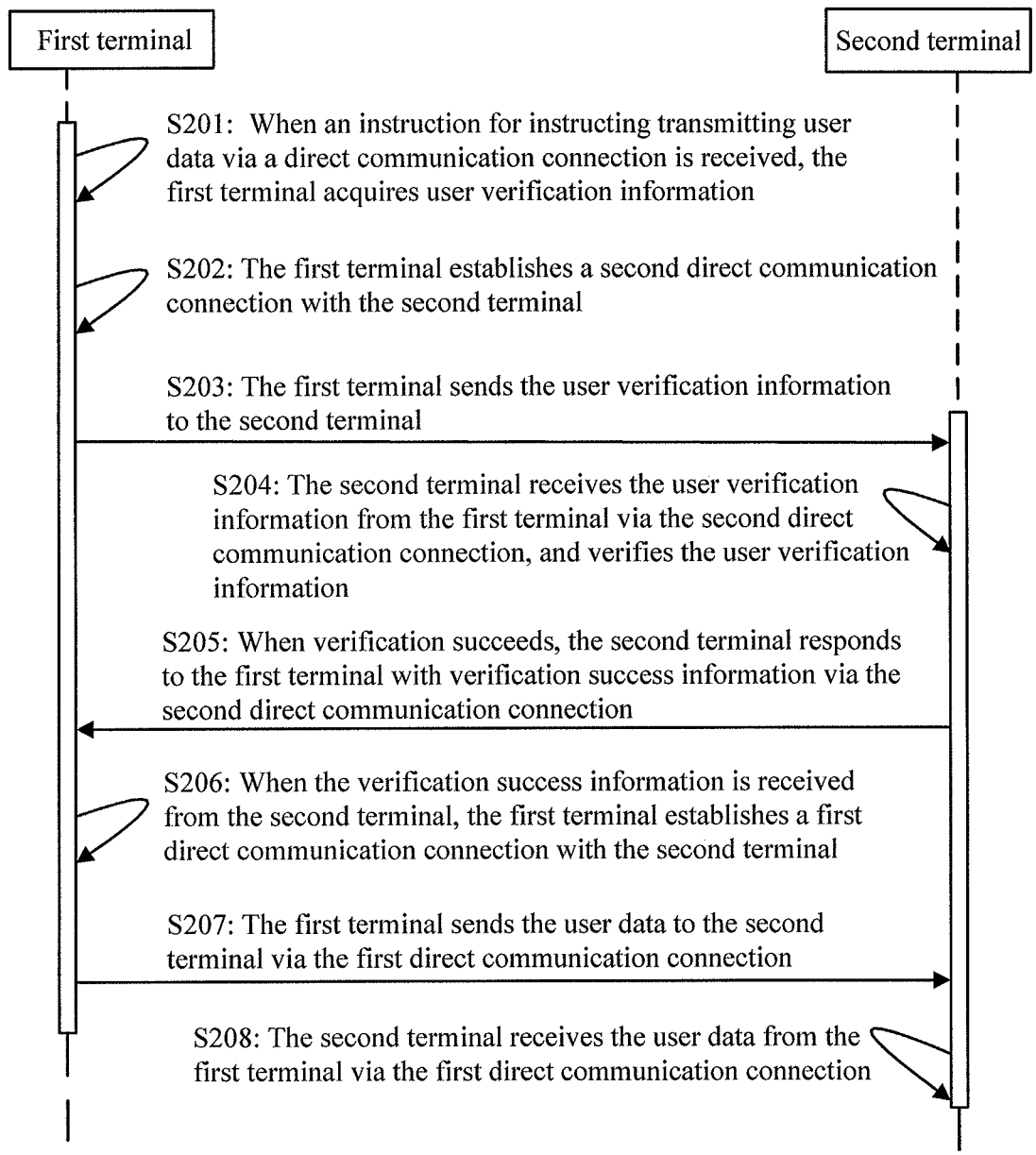
FIG. 2 is an interaction diagram of a method for direct communication between terminals according to an embodiment of the disclosure.

FIG. 2 is an interaction diagram of a method for direct communication between terminals according to an embodiment of the disclosure. The method may be applied to a terminal which may include a memory, a processor and a computer program stored on the memory and capable of running on the processor. As illustrated in FIG. 2, the communication method includes the operations as illustrated in blocks S201-S208.

In the block S201, a first terminal acquires user verification information when an instruction for instructing transmitting user data via a direct communication connection is received.

In an embodiment of the disclosure, when the instruction for instructing transmission of the user data is received, if the first terminal is currently in a direct communication mode, the first terminal acquires the user verification information. The user verification information may include verification data input through the first terminal. In an embodiment, the user verification information may include an equipment identifier of the first terminal, in addition to the verification data. Here, the verification data may be fingerprint data.

In the block S202, the first terminal establishes a second direct communication connection with a second terminal.

In an embodiment of the disclosure, the first terminal may establish the second direct communication connection with the second terminal. Here, it is to be noted that the first terminal and the second terminal may transmit the user verification information and verification success information via the second direct communication connection, and may transmit a connection parameter used for establishing a first direct communication connection between the first terminal and the second terminal.

In the block S203, the first terminal sends the user verification information to the second terminal.

In an embodiment of the disclosure, the first terminal may send the user verification information to the second terminal. Specifically, the first terminal may establish the second direct communication connection with the second terminal. The first terminal may send the user verification information to the second terminal in a second direct communication mode after acquiring the verification information in the direct communication mode. As such, the second terminal may perform verification with verification information of an authorized user according to the received user verification information, wherein the verification information of the authorized user has been pre-stored in the second terminal. The second terminal then returns a verification result, which is verification success information or verification failure information, to the first terminal. Here, the user verification information includes the verification data input through the first terminal and the equipment identifier of the first terminal. The verification data may be the fingerprint data. For example, the first terminal may acquire the fingerprint data input through the first terminal and the equipment identifier of the first terminal in the direct communication mode, and then sends the acquired fingerprint data input through the first terminal and equipment identifier of the first terminal to the second terminal in the second direct communication mode established by the first terminal and the second terminal. Then, the second terminal may perform verification by using a corresponding relationship between verification data of an authorized user and an equipment identifier of a corresponding terminal, which is been pre-stored in the second terminal, and the received fingerprint data input through the first terminal and equipment identifier of the first terminal. Then, the second terminal responds to the first terminal with the verification result, i.e. the verification success information or the verification failure information.

In the block S204, the second terminal receives the user verification information from the first terminal via the second direct communication connection, and verifies the user verification information.

In an embodiment of the disclosure, the second terminal may receive the user verification information from the first terminal via the second direct communication connection, and verify the user verification information. Here, the user verification information may include user fingerprint information.

In the block S205, when verification succeeds, the second terminal responds to the first terminal with verification success information via the second direct communication connection.

In an embodiment of the disclosure, when verification succeeds, the second terminal may respond to the first terminal with the verification success information via the second direct communication connection. Specifically, the second terminal may verify the user verification information, and when verification succeeds, respond to the first terminal with the verification success information via the second direct communication connection. The verification information may include the verification success information or the verification failure information.

In the block S206, when the verification success information is received from the second terminal, the first terminal establishes a first direct communication connection with the second terminal.

In an embodiment of the disclosure, the first terminal may establish the first direct communication connection with the second terminal when receiving the verification success information which is sent from the second terminal after the second terminal verifies the user verification information. Specifically, the first terminal sends the acquired verification information to the second terminal in the second direct communication connection mode to enable the second terminal to perform matching verification on the verification information. The second terminal responds to the first terminal with the verification result. Here, the verification result may include the verification success information or the verification failure information. When the first terminal receives the verification success information from the second terminal, the first terminal may establish the second direct communication connection with the second terminal. Here, the direct communication connection includes the first direct communication connection or the second direct communication connection. The first direct communication connection is used for transmitting the user data between the terminals. The second direct communication connection is used for transmitting the user verification information and the verification success information between the terminals and transmit the connection parameter used for establishing the first direct communication connection between the first terminal and the second terminal.

As an optional embodiment, when the first terminal receives the verification failure information which is sent from the second terminal after the second terminal verifies the user verification information, the first terminal may send prompting information to the second terminal. Here, the prompting information is used for prompting the second terminal to perform a second verification on an identity of a user of the first terminal. When the first terminal receives the verification success information which is sent from the second terminal in response to the prompting information, the first terminal may establish the second direct communication connection with the second terminal according to the verification success information sent from the second terminal. As can be seen, after the second terminal fails to verify the user verification information sent to the second terminal by the first terminal, the first terminal may further send the prompting information to the second terminal to request the second terminal to verify the user identity of the first terminal for the second time. Thus it can be seen that the method may implement verification over the user verification information sent by the first terminal when the second terminal receives authorized user verification information which is not pre-stored, and is favorable for improving effectiveness of verification over the user verification information of the first terminal.

In an embodiment of the disclosure, after receiving the verification success information from the second terminal in the second direct communication connection mode, the first terminal may establish the first direct communication connection with the second terminal, and send the user data to be transmitted from the first terminal to the second terminal via the first direct communication connection. Thus it can be seen that the first terminal and the second terminal establish the first direct communication connection in a verification manner, and transmit user data therebetween in the first direct communication connection mode, which is favorable for improving security of direct communication between the terminals.

As an optional embodiment, in an embodiment of the disclosure, the first terminal may receive verification information from the second terminal in the second direct communication connection mode. Specifically, when the first terminal receives verification data from the second terminal and an equipment identifier of the second terminal, the first terminal may verify the received verification data and equipment identifier of the second terminal with a corresponding relationship, pre-stored in the first terminal, between verification data and an equipment identifier of a terminal. The first terminal responds to the second terminal with verification success information when verification succeeds. The first terminal responds to the second terminal with verification failure information when verification fails. After the first terminal responds to the second terminal with the verification failure information, the first terminal may receive prompting information from the second terminal. The prompting information is used for prompting the first terminal to perform verification for a second time on a user identity of the second terminal. The first terminal verifies the user identity of the second terminal in response to the received prompting information. When verification succeeds, the first terminal sends the verification success information to the second terminal. Thus it can be seen that the first terminal may send the verification information to the second terminal to request for verification in the second direct communication connection mode, and may also receive the verification information sent by the second terminal to verify the verification information. The method is favorable for improving the security of the direct communication between the terminals.

In the block S207, the first terminal sends the user data to the second terminal via the first direct communication connection.

In an embodiment of the disclosure, the first terminal may send the user data to the second terminal via the first direct communication connection.

In the block S208, the second terminal receives the user data from the first terminal via the first direct communication connection.

In an embodiment of the disclosure, the second terminal may receive the user data sent by the first terminal via the first direct communication connection in the first direct communication mode.

According to the embodiment of the disclosure, the first terminal establishes the second direct communication connection with the second terminal when the user verification information has been acquired, and sends the user verification information to the second terminal in the second direct communication mode. The second terminal verifies the user verification information received via the second direct communication connection, and when verification succeeds, the second terminal responds to the first terminal with the verification success information via the second direct communication connection. When the verification success information is received from the second terminal, the first terminal establishes the first direct communication connection with the second terminal, and sends the user data to the second terminal via the first direct communication connection. Therefore, the security of the direct communication between the terminals can be improved.

Figure 3:
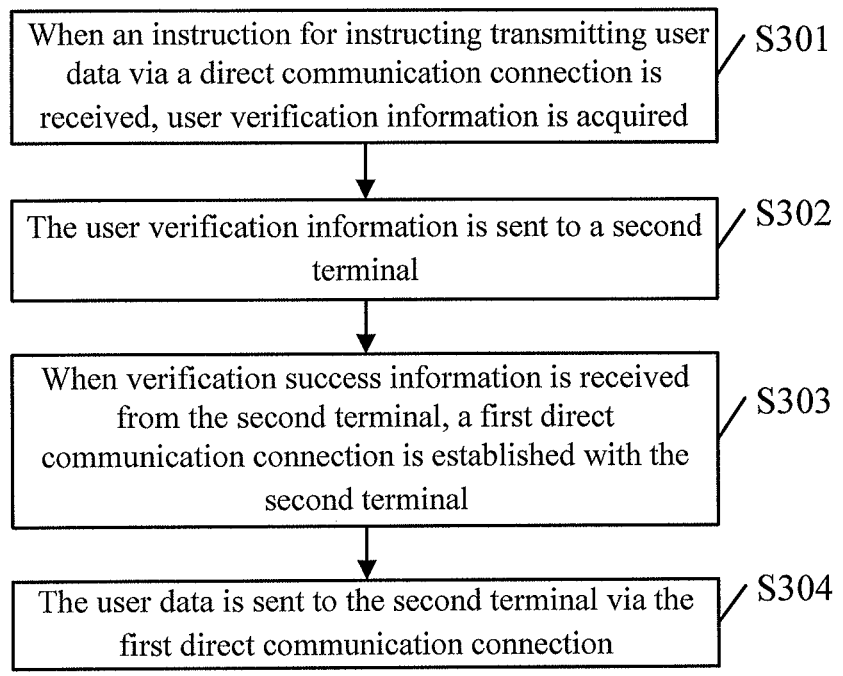
FIG. 3 is a flowchart of a communication method according to an embodiment of the disclosure.

FIG. 3 is a flowchart of a communication method according to an embodiment of the disclosure. The method may be applied to a terminal which may include a memory, a processor and a computer program stored on the memory and capable of running on the processor. As illustrated in FIG. 3, the communication method includes operations illustrated in block S301-S304.

In the block S301, when an instruction for instructing transmitting user data via a direct communication connection is received, user verification information is acquired.

In an embodiment of the disclosure, when the instruction for instructing transmission of the user data is received, if a first terminal is currently in a direct communication mode, the first terminal acquires the user verification information.

The user verification information may include verification data input through the first terminal and an equipment identifier of the first terminal. Here, the verification data may be fingerprint data.

In the block S302, the user verification information is sent to a second terminal.

In an embodiment of the disclosure, the first terminal may send the user verification information to the second terminal. Specifically, the first terminal may establish a second direct communication connection with the second terminal. The first terminal may send the user verification information to the second terminal in a second direct communication mode after acquiring the verification information in the direct communication mode. Then, the second terminal may perform verification with authorized user verification information pre-stored in the second terminal according to the received user verification information. Here, the user verification information includes the verification data input through the first terminal and the equipment identifier of the first terminal. The verification data may be the fingerprint data. For example, the first terminal may acquire the fingerprint data input through the first terminal and the equipment identifier of the first terminal in the direct communication mode, and then sends the acquired fingerprint data input through the first terminal and equipment identifier of the first terminal to the second terminal in the second direct communication mode established by the first terminal and the second terminal. Then, the second terminal may perform verification with a corresponding relationship, pre-stored in the second terminal, between verification data of an authorized user and an equipment identifier of a corresponding terminal according to the received fingerprint data input through the first terminal and equipment identifier of the first terminal. Then, the second terminal returns a verification result to the first terminal.

As an optional embodiment, after the first terminal acquires the user verification information, the first terminal may send the user verification information to the second terminal in the second direct communication connection mode. It is to be noted that the second direct communication connection mode is a connection mode which is high in security and low in eavesdropping rate in direct communication modes. When the first terminal sends the verification information in the second connection mode with higher security, security of data transmission during direct communication between terminals may be favorably improved.

As an optional embodiment, after the first terminal acquires the user verification information and sends the acquired user verification information to the second terminal in the second direct communication connection mode, the first terminal may receive verification success information returned by the second terminal in the second direct communication connection mode, and establish a first direct communication connection with the second terminal. As can be seen, the first terminal and the second terminal establish the first direct communication connection in the second direct communication connection mode with higher security, so that the security of communication between the terminals may be improved.

In the block S303, when verification success information is received from the second terminal, a first direct communication connection is established with the second terminal.

In an embodiment of the disclosure, the first terminal may establish the first direct communication connection with the second terminal when receiving the verification success information sent from the second terminal after the second terminal verifies the user verification information. Specifically, the first terminal sends the acquired verification information to the second terminal in the second direct communication connection mode to enable the second terminal to perform matching verification on the verification information. The second terminal responds to the first terminal with the verification result. Here, the verification result may include the verification success information or verification failure information. When the first terminal receives the verification success information from the second terminal, the first terminal may establish the second direct communication connection with the second terminal. Here, the direct communication connection includes the first direct communication connection or the second direct communication connection. The first direct communication connection is used for transmitting the user data between the terminals. The second direct communication connection is used for transmitting the user verification information and the verification success information between the terminals and transmitting a connection parameter for establishing the first direct communication connection between the first terminal and the second terminal.

As an optional embodiment, if the first terminal receives the verification failure information returned after the second terminal verifies the user verification information, the first terminal may send prompting information to the second terminal. Here, the prompting information is used for prompting the second terminal to perform verification for the second time on an identity of a user of the first terminal. When the first terminal receives the verification success information which is sent by the second terminal in response to the prompting information, the first terminal may establish the second direct communication connection with the second terminal according to the verification success information sent by the second terminal. As can be seen, after the second terminal fails to verify the user verification information sent to the second terminal by the first terminal, the first terminal may further send the prompting information to the second terminal to request the second terminal to verify the user identity of the first terminal for the second time. Thus it can be seen that the method may implement verification over the user verification information sent by the first terminal when the second terminal receives verification information which is not pre-stored as verification information of an authorized user, and is favorable for improving effectiveness of verification over the user verification information of the first terminal.

In the block S304, the user data is sent to the second terminal via the first direct communication connection.

In an embodiment of the disclosure, after receiving the verification success information returned by the second terminal in the second direct communication connection mode, the first terminal may establish the first direct communication connection with the second terminal. Then, the first terminal may send the user data to be transmitted to the second terminal via the first direct communication connection. Thus it can be seen that the first terminal and the second terminal establish the first direct communication connection in a verification manner, and transmit user data therebetween in the first direct communication connection mode, which is favorable for improving security of direct communication between the terminals.

As an optional embodiment, in an embodiment of the disclosure, the first terminal may receive verification information sent by the second terminal in the second direct communication connection mode. Specifically, when the first terminal receives verification data sent by the second terminal and an equipment identifier of the second terminal, the first terminal may verify the received verification data and equipment identifier of the second terminal with a corresponding relationship, pre-stored in the first terminal, between verification data and an equipment identifier of a terminal. The first terminal responds to the second terminal with verification success information when verification succeeds. The first terminal responds to the second terminal with verification failure information when verification fails. After the first terminal responds to the second terminal with the verification failure information, the first terminal may receive prompting information from the second terminal. The prompting information is used for prompting the first terminal to perform a second verification on a user identity of the second terminal. The first terminal verifies the user identity of the second terminal in response to the received prompting information. When verification succeeds, the first terminal sends the verification success information to the second terminal. Thus it can be seen that the first terminal may send the verification information to the second terminal to request for verification in the second direct communication connection mode, and may also receive the verification information sent by the second terminal to verify the verification information. The method is favorable for improving the security of the direct communication between the terminals.

In an embodiment of the disclosure, the first terminal may acquire the verification information in the direct communication mode and send the verification information to the second terminal in the second direct communication connection mode to enable the second terminal to verify the verification information. When the verification success information is received from the second terminal, the first terminal establishes the first direct communication connection with the second terminal, and sends the user data to the second terminal in the first direct communication connection mode. As can be seen, in an embodiment of the disclosure, the first terminal sends the verification information to the second terminal to request the second terminal for verification in the second direct communication connection mode, and establishes the first direct communication connection with the second terminal only after the first terminal receives the verification success information, so that the security of the direct communication between the terminals is favorably improved.

Figure 4:
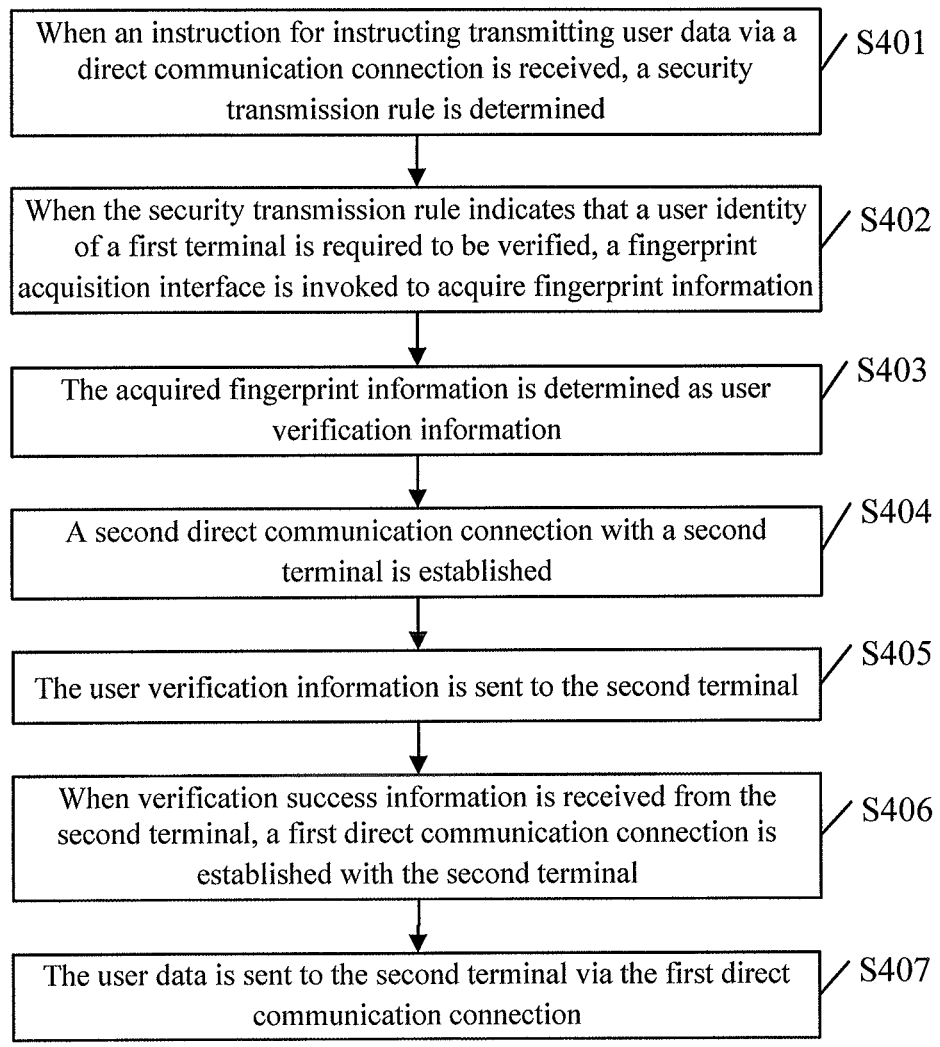
FIG. 4 is a flowchart of a second communication method according to an embodiment of the disclosure.

FIG. 4 is a flowchart of a second communication method according to an embodiment of the disclosure. The communication method may be applied to a terminal which may include a memory, a processor and a computer program stored on the memory and capable of running on the processor. As illustrated in FIG. 4, the communication method includes operations illustrated in blocks S401-S406.

In the block S401, when an instruction for instructing transmitting user data via a direct communication connection is received, a security transmission rule is determined.

In an embodiment of the disclosure, in case where a first terminal needs to send the user data to a second terminal in a direct communication mode, the first terminal may determine the security transmission rule when an instruction for instructing transmission of the user data via the direct communication connection is received by the first terminal. The security transmission rule is preset for the second terminal.

In the block S402, when the security transmission rule indicates that a user identity of a first terminal is required to be verified, a fingerprint acquisition interface is invoked to acquire fingerprint information.

In an embodiment of the disclosure, in case where the first terminal needs to send the user data to the second terminal in the direct communication mode, after it is determined that the second terminal needs to verify the user identity of the first terminal before the first terminal transmits the data to the second terminal, the first terminal may determine the security transmission rule when the instruction for instructing transmission of user data via the direct communication connection. When the security transmission rule indicates that the user identity of the first terminal is required to be verified, the fingerprint acquisition interface is invoked to acquire the fingerprint information.

In the block S403, the acquired fingerprint information is determined as verification data contained in user verification information.

In an embodiment of the disclosure, the first terminal may determine the acquired fingerprint information as the verification data contained in the user verification information.

In the block S404, a second direct communication connection with a second terminal is established.

In an embodiment of the disclosure, the first terminal may establish the second direct communication connection with the second terminal. Here, it is to be noted that the first terminal and the second terminal may transmit the user verification information and verification success information via the second direct communication connection, and may transmit a connection parameter configured to establish a first direct communication connection between the first terminal and the second terminal.

In the block S405, the user verification information is sent to the second terminal.

In an embodiment of the disclosure, the first terminal may send the user verification information to the second terminal. Specifically, the first terminal may establish the second direct communication connection with the second terminal. The first terminal may send the user verification information to the second terminal in a second direct communication mode after acquiring the verification information in the direct communication mode, and then the second terminal may perform verification with authorized user verification information pre-stored in the second terminal according to the received user verification information, and return a verification result of the verification success information or verification failure information to the first terminal. Here, the user verification information includes the verification data input through the first terminal and the equipment identifier of the first terminal, and the verification data may be the fingerprint data. For example, the first terminal may acquire the fingerprint data input through the first terminal and the equipment identifier of the first terminal in the direct communication mode, and then sends the acquired fingerprint data input through the first terminal and equipment identifier of the first terminal to the second terminal in the second direct communication mode established by the first terminal and the second terminal, and then the second terminal may perform verification with a corresponding relationship, pre-stored in the second terminal, between verification data of an authorized user and an equipment identifier of a corresponding terminal according to the received fingerprint data input through the first terminal and equipment identifier of the first terminal, and returns the verification result of the verification success information or the verification failure information to the first terminal.

In the block S406, when verification success information is received from the second terminal, a first direct communication connection is established with the second terminal.

In an embodiment of the disclosure, the first terminal may establish the first direct communication connection with the second terminal when receiving the verification success information returned after the second terminal verifies the user verification information. Specifically, the first terminal sends the acquired verification information to the second terminal in the second direct communication connection mode to enable the second terminal to perform matching verification on the verification information. The second terminal responds to the first terminal with the verification result. Here, the verification result includes the verification success information or the verification failure information. When the first terminal receives the verification success information returned by the second terminal, the first terminal may establish the second direct communication connection with the second terminal. Here, the direct communication connection includes the first direct communication connection or the second direct communication connection. The first direct communication connection is used for transmitting the user data between the terminals. The second direct communication connection is used for transmitting the user verification information and the verification success information between the terminals and transmit the connection parameter configured to establish the first direct communication connection between the first terminal and the second terminal.

As an optional embodiment, if the first terminal receives the verification failure information returned after the second terminal verifies the user verification information, the first terminal may send prompting information to the second terminal. Here, the prompting information is used for prompting the second terminal to perform a second verification on the user identity of the first terminal. If the first terminal receives the verification success information returned by the second terminal and obtained in response to the prompting information, the first terminal may execute the operation that the first terminal establishes the second direct communication connection with the second terminal according to the verification success information returned by the second terminal. As can be seen, after the second terminal fails to verify the user verification information sent to the second terminal by the first terminal, the first terminal may further send the prompting information to the second terminal to request the second terminal to verify the user identity of the first terminal for the second time. Thus it can be seen that the method may implement verification over the user verification information sent by the first terminal when the second terminal receives authorized user verification information which is not pre-stored, and is favorable for improving effectiveness of verification over the user verification information of the first terminal.

In an embodiment of the disclosure, after receiving the verification success information returned by the second terminal in the second direct communication connection mode, the first terminal may establish the first direct communication connection with the second terminal, and send the user data to be transmitted of the first terminal to the second terminal via the first direct communication connection. Thus it can be seen that the first terminal and the second terminal establish the first direct communication connection in a verification manner, and transmit user data to each other in the first direct communication connection mode, which is favorable for improving security of direct communication between the terminals.

As an optional embodiment, in an embodiment of the disclosure, the first terminal may receive verification information sent by the second terminal in the second direct communication connection mode. Specifically, when the first terminal receives verification data sent by the second terminal and an equipment identifier of the second terminal, the first terminal may verify the received verification data and equipment identifier of the second terminal with a corresponding relationship, pre-stored in the first terminal, between verification data and an equipment identifier of a terminal. The first terminal responds to the second terminal with verification success information when verification succeeds. The first terminal responds to the second terminal with verification failure information when verification fails. After the first terminal responds to the second terminal with the verification failure information, the first terminal may receive prompting information returned by the second terminal. The prompting information is used for prompting the first terminal to perform a second verification on a user identity of the second terminal. The first terminal verifies the user identity of the second terminal in response to the received prompting information. When verification succeeds, the first terminal sends the verification success information to the second terminal. Thus it can be seen that the first terminal may send the verification information to the second terminal to request for verification in the second direct communication connection mode, and may also receive the verification information sent by the second terminal to verify the verification information. Thus, the method is favorable for improving the security of the direct communication between the terminals.

In the block S407, the user data is sent to the second terminal via the first direct communication connection.

In an embodiment of the disclosure, the first terminal may send the user data to the second terminal via the first direct communication connection.

In an embodiment of the disclosure, the first terminal may acquire the verification information in the direct communication mode and send the verification information to the second terminal in the second direct communication connection mode to enable the second terminal to verify the verification information. When the verification success information is received from the second terminal, the first terminal establishes the first direct communication connection with the second terminal, and sends the user data to the second terminal in the first direct communication connection mode. As can be seen, in an embodiment of the disclosure, the first terminal sends the verification information to the second terminal to request the second terminal for verification in the second direct communication connection mode, and establishes the first direct communication connection with the second terminal only after the first terminal receives the verification success information. As such, the security of the direct communication between the terminals can be favorably improved.

Figure 5:
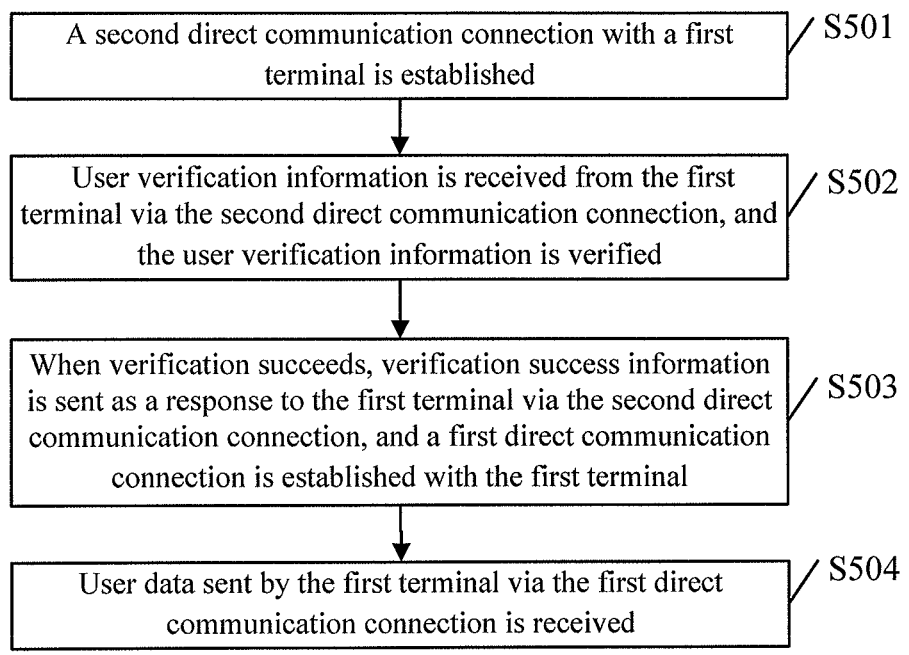
FIG. 5 is a flowchart of a third communication method according to an embodiment of the disclosure.

FIG. 5 is a flowchart of a third communication method according to an embodiment of the disclosure. The communication method may be applied to a terminal which may include a memory, a processor and a computer program stored on the memory and capable of running on the processor. As illustrated in FIG. 5, the communication method may include operations illustrated in blocks S501-S504.

In the block S501, a second direct communication connection with a first terminal is established.

In the block S502, user verification information is received from the first terminal via the second direct communication connection, and the user verification information is verified.

In an embodiment of the disclosure, a second terminal may receive the user verification information from the first terminal via the second direct communication connection, and verify the user verification information. The user verification information may include fingerprint information of a user of the first terminal.

Optionally, before receiving the user verification information sent by the first terminal, the second terminal may acquire the fingerprint of the user of the first terminal and store the fingerprint information of the user.

Optionally, before receiving the user verification information sent by the first terminal, the second terminal may establish the second direct communication connection with the first terminal. Here, the second terminal and the first terminal transmit the user verification information and verification success information via the second direct communication connection, and transmit a connection parameter for establishing a first direct communication connection between the first terminal and the second terminal via the second direct communication connection.

In the block S503, when verification succeeds, verification success information is sent as a response to the first terminal via the second direct communication connection, and a first direct communication connection is established with the first terminal.

In an embodiment of the disclosure, when verification succeeds, the second terminal responds to the first terminal with the verification success information via the second direct communication connection, and establishes the first direct communication connection with the first terminal.

In the block S504, user data is received from the first terminal via the first direct communication connection.

In an embodiment of the disclosure, the second terminal may receive the user data from the first terminal via the first direct communication connection.

In an embodiment of the disclosure, the second terminal may receive the user verification information sent by the first terminal, verify the user verification information, respond to the first terminal with the verification success information. The second terminal then establishes the first direct communication connection with the first terminal and receives the user data from the first terminal via the first direct communication connection. Thus, data transmission can be implemented via a direct communication between the terminals and security of data transmission can be improved.

Figure 6:
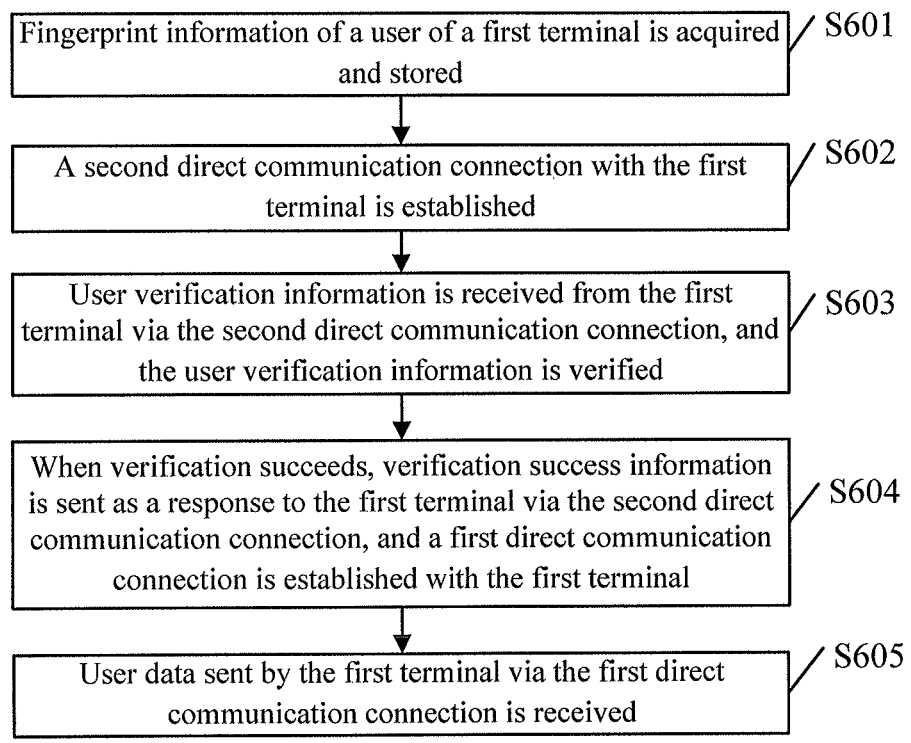
FIG. 6 is a flowchart of a fourth communication method according to an embodiment of the disclosure.

FIG. 6 is a flowchart of a fourth communication method according to an embodiment of the disclosure. The communication method may be applied to a terminal which may include a memory, a processor and a computer program stored on the memory and capable of running on the processor. As illustrated in FIG. 6, the communication method includes operations illustrated in blocks S601-S605.

In the block S601, fingerprint information of a user of a first terminal is acquired and stored.

In an embodiment of the disclosure, a second terminal may acquire and store the fingerprint information of the user of the first terminal. The fingerprint information may be used as authentication information for verifying user verification information sent by the first terminal. The second terminal responds to the first terminal with verification success information after verification succeeds.

In the block S602, a second direct communication connection with the first terminal is established.

In an embodiment of the disclosure, the second terminal may establish the second direct communication connection with the first terminal. Here, the second terminal and the first terminal transmit the user verification information and the verification success information via the second direct communication connection, and transmit a connection parameter configured to establish a first direct communication connection between the first terminal and the second terminal via the second direct communication connection.

In the block S603, user verification information is received from the first terminal via the second direct communication connection, and the user verification information is verified.

In an embodiment of the disclosure, the second terminal may receive the user verification information sent by the first terminal via the second direct communication connection, and verify the user verification information. The user verification information may include the fingerprint information of the user of the first terminal.

In the block S604, when verification succeeds, verification success information is sent as a response to the first terminal via the second direct communication connection, and a first direct communication connection is established with the first terminal.

In an embodiment of the disclosure, when verification succeeds, the second terminal responds to the first terminal with the verification success information via the second direct communication connection, and establishes the first direct communication connection with the first terminal.

In the block S605, user data is received from the first terminal via the first direct communication connection.

In an embodiment of the disclosure, the second terminal may receive the user data sent by the first terminal via the first direct communication connection.

In an embodiment of the disclosure, the second terminal may receive the user verification information sent by the first terminal, verify the user verification information, respond to the first terminal with the verification success information, establish the first direct communication connection with the first terminal and receive the user data sent by the first terminal via the first direct communication connection. Data transmission can be implemented via a direct communication between the terminals and security of data transmission can be improved.

Figure 7:
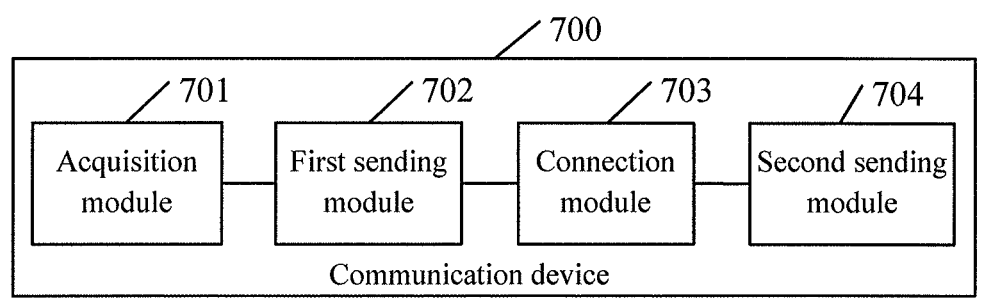
FIG. 7 is a structure diagram of a communication device according to an embodiment of the disclosure.

FIG. 7 is a structure diagram of a communication device according to an embodiment of the disclosure. The device may be applied to a terminal. The terminal may include a communication interface, a processor, a memory and a computer program stored on the memory and capable of running on the processor. As illustrated in FIG. 7, the communication device 700 includes an acquisition module 701, a first sending module 702, a connection module 703 and a second sending module 704. Here, the acquisition module 701 may be an input interface in communication interfaces. The connection module 703 may be a processor. The first sending module 702 and the second sending module 704 may be output interfaces in the communication interfaces.

The acquisition module 701 may be configured to, when an instruction for instructing transmitting user data via a direct communication connection is received, acquire user verification information. The user verification information may include verification data input by a first terminal.

The first sending module 702 may be configured to send the user verification information to a second terminal.

The connection module 703 may be configured to, when verification success information is received from the second terminal, establish a first direct communication connection with the second terminal.

The second sending module 704 may be configured to send the user data to the second terminal via the first direct communication connection.

Optionally, the connection module 703 may be further configured to establish a second direct communication connection with the second terminal. The first terminal and the second terminal transmit the user verification information and the verification success information via the second direct communication connection, and transmit a connection parameter configured to establish the first direct communication connection between the first terminal and the second terminal.

Optionally, the acquisition module 701 may be specifically configured to, when the instruction for instructing transmitting the user data via the direct communication connection is received, determine a security transmission rule. The security transmission rule is preset for the second terminal. When the security transmission rule indicates that an identity of a user of the first terminal is required to be verified, the acquisition module 701 may invoke a fingerprint acquisition interface to acquire fingerprint information and determine the acquired fingerprint information as the verification data contained in the user verification information.

In an embodiment of the disclosure, the acquisition module 701 of the first terminal acquires the verification information in a direct communication mode. The first sending module 702 sends the verification information to the second terminal in a second direct communication connection mode to enable the second terminal to verify the verification information. When the first terminal receives the verification success information returned by the second terminal, the connection module 703 establishes the first direct communication connection with the second terminal. It can be seen that in an embodiment of the disclosure, the first terminal sends the verification information to the second terminal to request the second terminal for verification in the second direct communication connection mode, and establishes the first direct communication connection with the second terminal only after the first terminal receives the verification success information. Thus, security of direct communication between the terminals can be favorably improved.

It can be understood that a function of each program module of the communication device 700 of the embodiment may be specifically realized according to the methods in the method embodiments, and a specific realization process thereof may refer to related descriptions of the method embodiments, and will not be elaborated herein.

Figure 8:
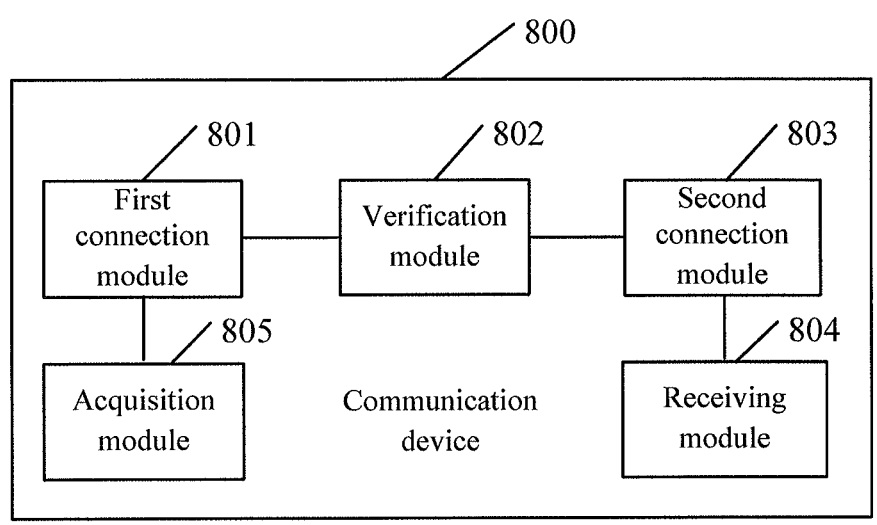
FIG. 8 is a structure diagram of another communication device according to an embodiment of the disclosure.

FIG. 8 is a structure diagram of another communication device according to an embodiment of the disclosure. The device may be applied to a terminal. The terminal may include a communication interface, a processor, a memory and a computer program stored on the memory and capable of running on the processor. As illustrated in FIG. 8, the communication device 800 includes a first connection module 801, a verification module 802, a second connection module 803, a receiving module 804 and an acquisition module 805. Here, the receiving module 804 and the acquisition module 805 may be input interfaces in communication interfaces. The first connection module 801, the verification module 802 and the second connection module 803 may be processors.

The first connection module 801 may be configured to establish a second direct communication connection with a first terminal.

The verification module 802 may be configured to receive user verification information from the first terminal via the second direct communication connection, and verify the user verification information.

The second connection module 803 may be configured to, when verification succeeds, respond to the first terminal with verification success information via the second direct communication connection, and establish a first direct communication connection with the first terminal.

The receiving module 804 may be configured to receive user data from the first terminal via the first direct communication connection.

Optionally, the device may further include an acquisition module 805.

The acquisition module 805 may be configured to acquire and store fingerprint information of a user of the first terminal, the fingerprint information being configured to verify the user verification information sent by the first terminal as authentication information, and respond to the first terminal with the verification success information after verification succeeds.

Optionally, the second connection module 803 may be configured to transmit, via the second direct communication connection, at least one connection parameter for establishing the first direct communication connection between the first terminal and the second terminal, and establish the first direct communication connection with the first terminal according to the connection parameter.

Figure 9:
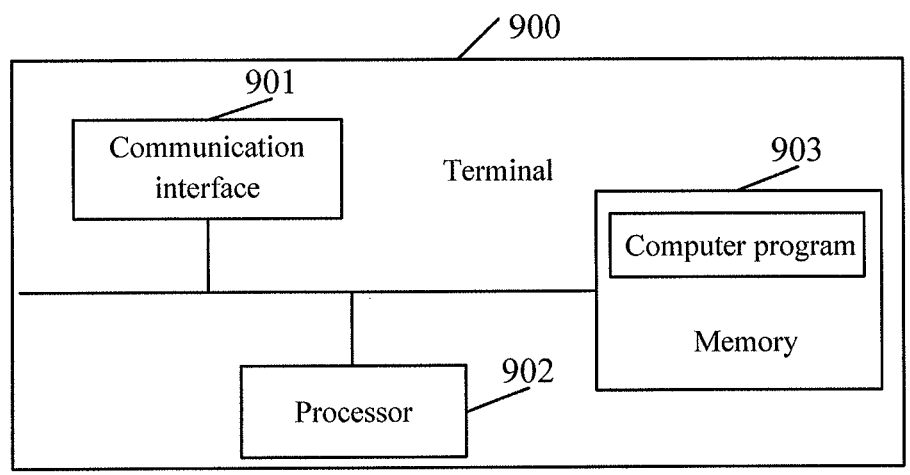
FIG. 9 is a structure diagram of a terminal according to an embodiment of the disclosure.

FIG. 9 is a structure diagram of a terminal according to an embodiment of the disclosure. The terminal may include a communication interface 901, a processor 902, a memory 903 and a computer program stored on the memory and capable of running on the processor.

The communication interface 901 may be configured to perform processing for interaction data generated by the terminal, and includes a part such as a touch display screen.

The memory 903 may include a volatile memory. The memory 903 may also include a non-volatile memory. The memory 903 may further include a combination of the memories of the abovementioned types. The processor 902 may be a Central Processing Unit (CPU). The processor 902 may further include a hardware chip. The hardware chip may be an Application-Specific Integrated Circuit (ASIC), a Programmable Logic Device (PLD) or a combination thereof. The PLD may be a Complex Programmable Logic Device (CPLD), a Field-Programmable Gate Array (FPGA) or any combination thereof.

Optionally, the memory 903 is configured to store the computer program capable of running on the processor. The processor 902 may call the computer program stored in the memory and capable of running on the processor to implement the communication method in the embodiment corresponding to any one of FIG. 1 to FIG. 5.

Specifically, when executing the program, the processor 902 is configured to implement the following operations that: when an instruction for instructing transmitting user data via a direct communication connection is received, user verification information is acquired, the user verification information including verification data input by a first terminal; the user verification information is sent to a second terminal; when verification success information is received from the second terminal, a first direct communication connection is established with the second terminal; and the user data is sent to the second terminal via the first direct communication connection.

Optionally, when executing the program, the processor 902 is further configured to implement the following operations that: a second direct communication connection with the second terminal is established; the first terminal and the second terminal transmit the user verification information and the verification success information via the second direct communication connection, and transmit, via the second direct communication connection, at least one connection parameter for establishing the first direct communication connection between the first terminal and the second terminal.

Optionally, when executing the program, the processor 902 is further configured to implement the following operations that: when the instruction for instructing transmitting the user data via the direct communication connection is received, a security transmission rule is determined, the security transmission rule being preset for the second terminal; when the security transmission rule indicates that an identity of a user of the first terminal is required to be verified, call a fingerprint acquisition interface to acquire fingerprint information; and the acquired fingerprint information is determined as the user verification information.

In an embodiment of the disclosure, the first terminal may acquire the verification information in a direct communication mode and send the verification information to the second terminal in a second direct communication connection mode to enable the second terminal to verify the verification information, and when the verification success information is received from the second terminal, the first terminal establishes the first direct communication connection with the second terminal, and sends the user data to the second terminal in a first direct communication connection mode. It can be seen that in an embodiment of the disclosure, the first terminal sends the verification information to the second terminal to request the second terminal for verification in the second direct communication connection mode, and establishes the first direct communication connection with the second terminal only after the first terminal receives the verification success information, so that the security of the direct communication between the terminals is favorably improved.

In the embodiments illustrated in FIG. 1-FIG. 5, various method flows may be implemented on the basis of the structure of the terminal.

An embodiment of the disclosure further provides a computer storage medium. Here, the computer storage medium stores a computer program configured for electronic data exchange, and the computer program enables a computer to execute part or all of the operations of any communication method recorded in the method embodiments.

An embodiment of the disclosure further provides a computer program product, which includes a non-transitory computer-readable storage medium storing a computer program. Here, the computer program may be operated to enable a computer to execute part or all of the operations of any communication method recorded in the method embodiments. The computer program product may be a software installation package.

It is to be noted that, for simple description, each of the abovementioned method embodiments is expressed as a combination of a series of actions. However, those skilled in the art should know that the disclosure is not limited to a described action sequence because some operations may be executed in another sequence or at the same time according to the disclosure. Second, those skilled in the art should also know that the embodiments described in the specification all belong to preferred embodiments and involved actions and units are optional for the disclosure.

Each embodiment in the abovementioned embodiments is described with different particular emphases, and parts which are not elaborated in a certain embodiment may refer to related descriptions of the other embodiments.

In some embodiments provided by the disclosure, it should be understood that the disclosed device may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also physically exist independently, and two or more than two units may also be integrated into a unit. The integrated unit may be implemented in a hardware form, and may also be implemented in form of software program unit.

When being implemented in form of software program unit and sold or used as an independent product, the integrated unit may be stored in a computer-readable memory. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the operations of the method in each embodiment of the disclosure. The memory includes: various media capable of storing program codes such as a U disk, a Read-Only Memory (ROM), a Random Access Memory (RAM), a mobile hard disk, a magnetic disk or an optical disk.

Those skilled in the art should know that: all or part of the operations of each method in the embodiments may be implemented by instructing related hardware through a program, the program may be stored in a computer-readable memory, and the memory includes: various media capable of storing program codes such as a flash disk, a ROM, a RAM, a magnetic disk or an optical disk.

The embodiments of the disclosure are introduced above in detail. The principle and implementation modes of the disclosure are elaborated with specific examples in the disclosure. The above descriptions about the embodiments are only made to help the methods and core concept of the disclosure to be understood. In addition, those skilled in the art may make changes to the specific implementation modes and the scope of application according to the concept of the disclosure. From the above, the contents of the specification should not be understood as limits to the disclosure.

The invention claimed is:

1. A communication method, applied to a first terminal, the method comprising:
when an instruction for instructing transmitting user data via a direct communication connection is received, acquiring user verification information, the user verification information comprising verification data input through the first terminal;
sending the user verification information to a second terminal;
when verification success information is received from the second terminal, establishing a first direct communication connection with the second terminal; and
sending the user data to the second terminal via the first direct communication connection;
wherein acquiring the user verification information when the instruction for instructing transmitting the user data via the direct communication connection is received comprises:
when the instruction for instructing transmitting the user data via the direct communication connection is received, determining a security transmission rule, the security transmission rule being preset for the second terminal; and when the security transmission rule indicates that an identity of a user of the first terminal is required to be verified, acquiring the verification data;
wherein the method further comprises:
establishing a second direct communication connection with the second terminal, wherein
the first terminal transmits the user verification information to the second terminal via the second direct communication connection, receives the verification success information from the second terminal via the second direct communication connection, and transmits via the second direct communication connection, at least one connection parameter for establishing the first direct communication connection between the first terminal and the second terminal;
wherein the method further comprises:
determining y the first terminal, whether power of the first terminal is less than a preset threshold; and
when the power of the first terminal is less than the preset threshold, establishing the second direct communication connection with the second terminal.

2. The communication method as claimed in claim 1, wherein the user verification information further comprises an identifier of the first terminal.

3. The communication method as claimed in claim 1, wherein acquiring the verification data comprises:
invoking a fingerprint acquisition interface of the first terminal to acquire a fingerprint as the verification data.

4. The communication method as claimed in claim 1, wherein the first direct communication connection is a hotspot communication connection established between the first terminal and the second terminal, and the second direct communication connection is a Near Field Communication (NFC) connection established between the first terminal and the second terminal.

5. The communication method as claimed in claim 1, further comprising: when the power of the first terminal is greater than or equal to the present threshold, establishing directly the first direct communication connection with the second terminal without establishing the second direct communication connection.

6. A communication method, applied to a second terminal, the method comprising:
establishing a second direct communication connection with a first terminal;
receiving user verification information from the first terminal via the second direct communication connection, and verifying the user verification information, wherein the user verification information comprises verification data input through the first terminal, and acquiring the user verification information by the first terminal comprises: when an instruction for instructing transmitting user data via a direct communication connection is received, determining a security transmission rule, the security transmission rule being preset for the second terminal; and
when the security transmission rule indicates that an identity of a user of the first terminal is required to be verified, acquiring the verification data;
when verification succeeds, responding to the first terminal with verification success information via the second direct communication connection, and establishing a first direct communication connection with the first terminal; and
receiving user data sent by the first terminal via the first direct communication connection;

wherein the method further comprises:
when it is determined by the first terminal that power of the first terminal is less than a preset threshold, establishing the second direct communication connection with the first terminal.

7. The communication method as claimed in claim 6, wherein the method further comprises: before receiving the user verification information from the first terminal via the second direct communication connection, acquiring and storing authentication information of a user of the first terminal,
and wherein the verifying the user verification information comprises: matching the authentication information with the verification data contained in the user verification information received from the first terminal, and determining whether the verifying is successful according to a result of the matching.

8. The communication method as claimed in claim 7, wherein the authentication information is a fingerprint of a user of the first terminal, and the verification data is fingerprint data.

9. The communication method as claimed in claim 7, wherein the user verification information further comprises an identifier of the first terminal,
the matching the authentication information with the verification data contained in the user verification information received from the first terminal comprises: comparing a correspondence between the identifier of the first terminal and the verification data, which are received from the first terminal, with a correspondence between the identifier of the first terminal and the authentication information, which are pre-stored in the second terminal.

10. The communication method as claimed in claim 6, wherein establishing the first direct communication connection with the first terminal comprises:
transmitting, via the second direct communication connection, at least one connection parameter for establishing the first direct communication connection between the first terminal and the second terminal; and
establishing the first direct communication connection with the first terminal according to the at least one connection parameter.

11. The communication method as claimed in claim 6, wherein the first direct communication connection is a hotspot communication connection established between the first terminal and the second terminal, and the second direct communication connection is a Near Field Communication (NFC) connection established between the first terminal and the second terminal.

12. A communication device, disposed as a first terminal, the device comprising:
a processor; and
a memory configured to store instructions executable for the processor;
wherein the processor is configured to perform operations of:
when an instruction for instructing transmitting user data via a direct communication connection is received, acquiring user verification information, the user verification information comprising verification data input through the first terminal;
sending the user verification information to a second terminal;
when verification success information is received from the second terminal, establishing a first direct communication connection with the second terminal; and sending the user data to the second terminal via the first direct communication connection;

wherein acquiring the user verification information when the instruction for instructing transmitting the user data via the direct communication connection is received comprises:

when the instruction for instructing transmitting the user data via the direct communication connection is received, determining a security transmission rule, the security transmission rule being preset for the second terminal; and when the security transmission rule indicates that an identity of a user of the first terminal is required to be verified, acquiring the verification data;

wherein the processor is further configured to perform operations of:

establishing a second direct communication connection with the second terminal, wherein the first terminal transmits the user verification information to the second terminal via the second direct communication connection, receives the verification success information from the second terminal via the second direct communication connection, and transmits via the second direct communication connection, at least one connection parameter for establishing the first direct communication connection between the first terminal and the second terminal;

wherein the processor is further configured to:

determine whether power of the first terminal is less than a preset threshold; and when the power of the first terminal is less than the preset threshold, establish the second direct communication connection with the second terminal.

13. The communication terminal as claimed in claim 12, wherein the user verification information further comprises an identifier of the first terminal.

14. The communication terminal as claimed in claim 12, wherein acquiring the verification data comprises:

invoking a fingerprint acquisition interface of the first terminal to acquire a fingerprint as the verification data.

15. The communication terminal as claimed in claim 12, wherein the first direct communication connection is a hotspot communication connection established between the first terminal and the second terminal, and a second direct communication connection is a Near Field Communication (NFC) connection established between the first terminal and the second terminal, wherein the processor is further configured to:

when the power of the first terminal is greater than or equal to the present threshold, establish directly the first direct communication connection with the second terminal without establishing the second direct communication connection.

* * * * *